(No Model.)
P. C. DILLAN.
FIELD OR GARDEN IMPLEMENT.
No. 559,369. Patented May 5, 1896.
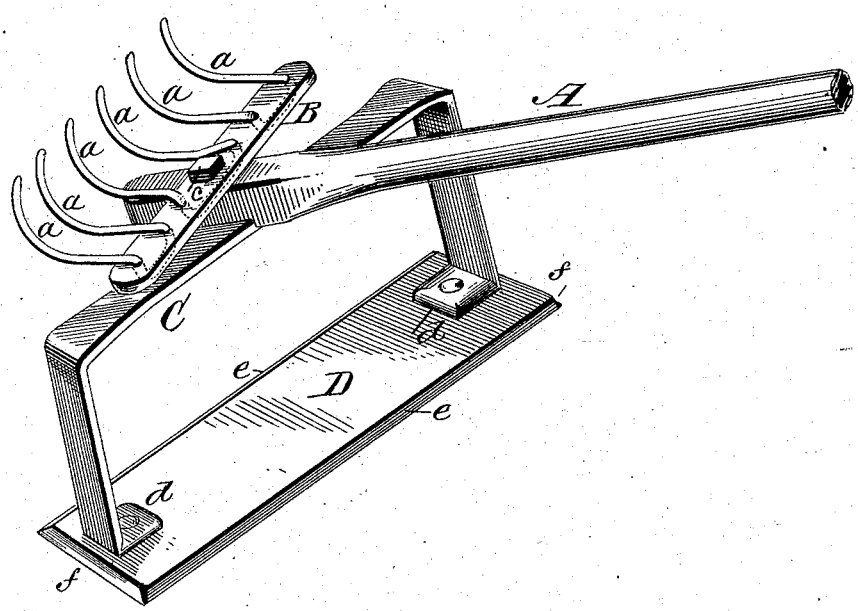
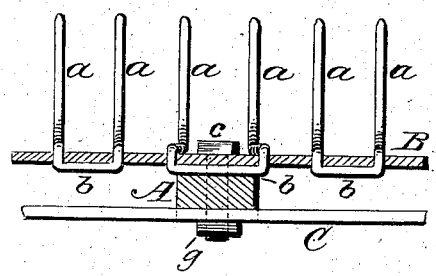
Witnesses
L. J. Williamson.
E. Bradford.
Inventor
Price C. Dillan.
per Chas. H. Fowler
Attorney.

UNITED STATES PATENT OFFICE.

PRICE COOPER DILLAN, OF ESSEX, IOWA.

FIELD OR GARDEN IMPLEMENT.

SPECIFICATION forming part of Letters Patent No. 559,369, dated May 5, 1896.

Application filed August 29, 1895. Serial No. 560,844. (No model.)

*To all whom it may concern:*

Be it known that I, PRICE COOPER DILLAN, a citizen of the United States, residing at Essex, in the county of Page and State of Iowa, have invented certain new and useful Improvements in Field or Garden Implements; and I do hereby declare that the following is a full, clear, and exact description of the same, reference being had to the annexed drawings, making a part of this specification, and to the letters of reference marked thereon.

The present invention has for its object to provide a field or garden implement that will possess strength and durability and be simple in construction as well as effective in its purpose in working the soil, cutting roots and weeds, and other like obstructions usually found in a field or garden.

The invention consists in an implement constructed substantially as shown in the drawings and hereinafter described and claimed.

Figure 1 of the drawings is a perspective view of a field or garden implement constructed in accordance with my invention; Fig. 2, an end view partly in section.

In the accompanying drawings, A represents the handle, which may be of any suitable length and of any desirable construction. At the lower end of the handle, upon one side thereof, is fastened a rake-head B by means of a screw-bolt c, which bolt extends through said head and handle. This rake-head is connected to the handle at right angles to the length thereof, and secured to said head are the rake-teeth a, which are formed of spring-wire of suitable thickness and strength, and are curved as shown. Each pair of rake-teeth are formed from a single length of wire and connected by a transverse brace b, which bears against the surface of the rake-head, the teeth passing through holes in the head. This manner of constructing the teeth gives them increased strength with no possibility of the teeth turning upon their axis or becoming disconnected from their fastenings, the transverse brace b giving strength and firmness to each pair of teeth and increasing their durability. To the opposite side of the handle A is secured a bracket C by means of the same bolt that secures the rake-head in place, said bolt passing down through the rake-head and through the handle and also the bracket, a nut engaging the screw-threaded end of the bolt to hold the rake-head and bracket in position. The upright portions of the bracket C have feet or flanges d, to which the hoe-blade D is riveted or otherwise secured. This blade is formed of steel and has opposite cutting edges e, and, if desired, cutting edges may be formed on the ends of the blade, as shown at f. It should be noticed that this blade, which may be of any suitable width and length and of any desirable thickness, is obliquely to the length of the handle, thereby giving the cutting edge, when coming in contact with the roots, weeds, or other like objects, an action similar to a shear cut, thereby rendering its effectiveness materially enhanced as a cutting implement. This oblique position of the blade also gives it an action similar to a plowshare, thus increasing its action when used for digging the soil and other like purposes.

The handle, rake-head, and the bracket may be of any suitable construction that may be found best adapted to the purpose.

The oblique position of the blade will also prevent the roots, weeds, and other similar objects from gathering on the blade, and the blade having a double cutting edge, the implement may be used in both directions with equal effectiveness.

Having now fully described my invention, what I claim as new, and desire to secure by Letters Patent, is—

A field or garden implement consisting of a suitable handle, a bracket connected thereto and obliquely to the length thereof, a double-edged hoe-blade attached to the bracket, a rake-head with curved teeth connected to the handle upon the opposite side to that of the bracket and at right angles to the handle, whereby said rake and hoe-blade will assume a position obliquely to each other, substantially as and for the purpose set forth.

In testimony that I claim the above I have hereunto subscribed my name in the presence of two witnesses.

PRICE COOPER DILLAN.

Witnesses:
G. M. GWYNN,
A. MATHER.